(12) United States Patent
Ramesh et al.

(10) Patent No.: US 12,348,401 B2
(45) Date of Patent: Jul. 1, 2025

(54) NEXT GENERATION WIRELINE WIRELESS AUTOMATION FOR TESTING AND VALIDATION OF NETWORK FUNCTIONS AND SERVICES

(71) Applicant: AT&T Intellectual Property I, L.P., Atlanta, GA (US)

(72) Inventors: Masoor Ramesh, Cumming, GA (US); David Purdy, Jasper, GA (US); Frederick Farmer, Cumming, GA (US); Sean Simon, Lynnwood, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 462 days.

(21) Appl. No.: 17/953,507

(22) Filed: Sep. 27, 2022

(65) Prior Publication Data

US 2024/0106731 A1    Mar. 28, 2024

(51) Int. Cl.
*H04W 24/00*  (2009.01)
*H04L 41/16*  (2022.01)
*H04L 43/50*  (2022.01)
*H04W 24/04*  (2009.01)

(52) U.S. Cl.
CPC .............. *H04L 43/50* (2013.01); *H04L 41/16* (2013.01); *H04W 24/04* (2013.01)

(58) Field of Classification Search
CPC ........ H04L 43/50; H04L 41/16; H04W 24/04; H04W 24/02; H04W 24/10; H04W 24/06

USPC ......................................................... 455/423
See application file for complete search history.

(56) References Cited

U.S. PATENT DOCUMENTS

| 2021/0006993 | A1* | 1/2021 | Chow ............... | H04L 43/0888 |
| 2023/0164598 | A1* | 5/2023 | Yao ................ | H04W 24/04 370/252 |
| 2023/0300648 | A1* | 9/2023 | Wangler ............ | H04W 24/08 370/252 |

FOREIGN PATENT DOCUMENTS

WO    WO2021034906 A1 *  2/2021  ......... H04B 7/18515

* cited by examiner

*Primary Examiner* — Tanmay K Shah
(74) *Attorney, Agent, or Firm* — Guntin & Gust, PLC; Kenneth S. Kwan

(57) ABSTRACT

Aspects of the subject disclosure may include, for example, determining that one or more tests are to be executed for a core network of a telecommunications system, based on the determining, transmitting one or more test initiation commands to a set of user equipment (UEs) of a plurality of UEs communicatively coupled to the core network, wherein the one or more test initiation commands cause the set of UEs to execute the one or more tests, obtaining, from the set of UEs, results associated with the one or more tests, analyzing the results based on one or more machine learning (ML) models to identify a network issue, and responsive to the analyzing, performing one or more actions to address the network issue. Other embodiments are disclosed.

20 Claims, 8 Drawing Sheets

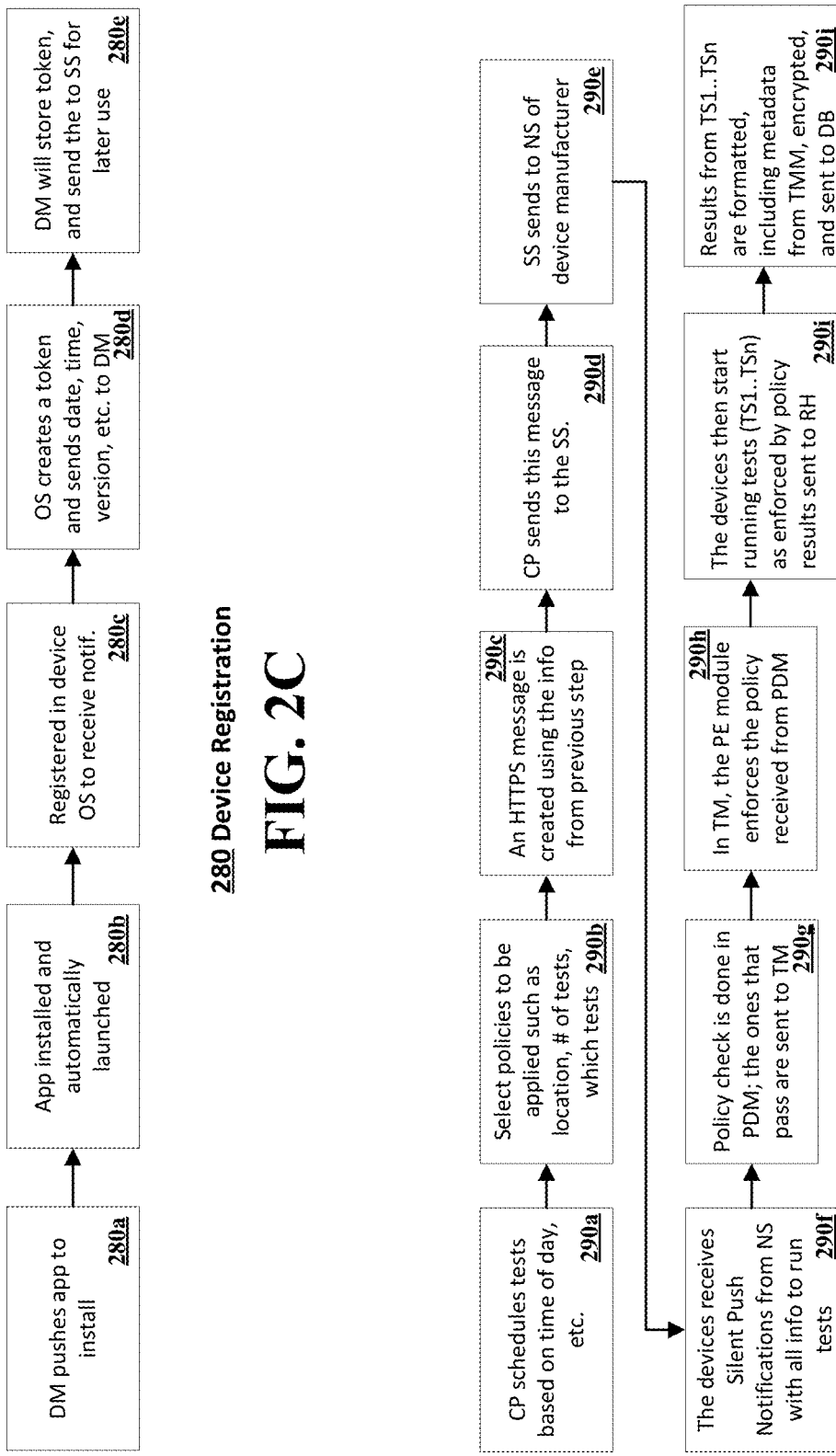

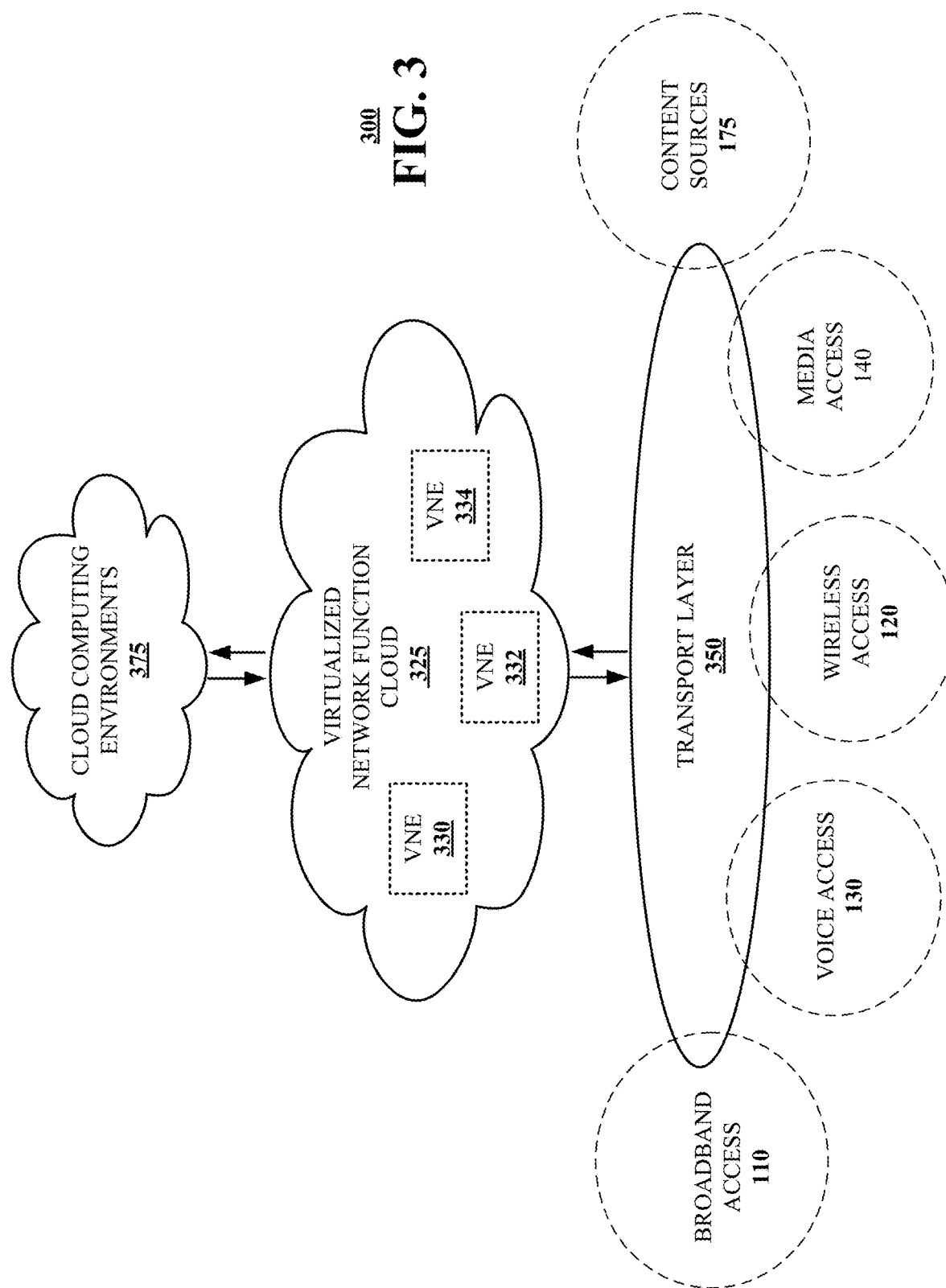

NEXT GENERATION WIRELINE WIRELESS AUTOMATION FOR TESTING AND VALIDATION OF NETWORK FUNCTIONS AND SERVICES

FIELD OF THE DISCLOSURE

The subject disclosure relates to automated command and control testing or deployment of test scenarios at scale to characterize/assess a core network infrastructure or subscriber experience.

BACKGROUND

A mobile network generally consists of a (e.g., wireless) core network that provides network services and data network connectivity for end users, and an access network that provides end user access to the core. The overall infrastructure of the core and access networks can be complex. As technology continues to advance, these networks are subject to upgrades, enhancements with new features (or removal of unneeded features), migration, and decommissioning.

Changes that are made to a network are typically accompanied by regression testing in affected geographic regions to ensure that network operations and functions are not negatively impacted. Testing is thus a crucial part of network deployment and maintenance. Presently, testing is mostly done manually, where individuals (i.e., testers) are dispatched to locations of interest to run the appropriate tests. For instance, a test operator might physically travel to a given location and visually inspect equipment and operate specific devices to test certain network functionality. Tests reports are also manually generated and transmitted—e.g., via e-mail or the like with an indication of pass, fail, etc.

BRIEF DESCRIPTION OF THE DRAWINGS

Reference will now be made to the accompanying drawings, which are not necessarily drawn to scale, and wherein:

FIG. 2C depicts an illustrative embodiment of a device registration method in accordance with various aspects described herein.

FIG. 2D depicts an illustrative embodiment of a test execution method in accordance with various aspects described herein.

FIG. 3 is a block diagram illustrating an example, non-limiting embodiment of a virtualized communications network in accordance with various aspects described herein.

DETAILED DESCRIPTION

Figure 1:
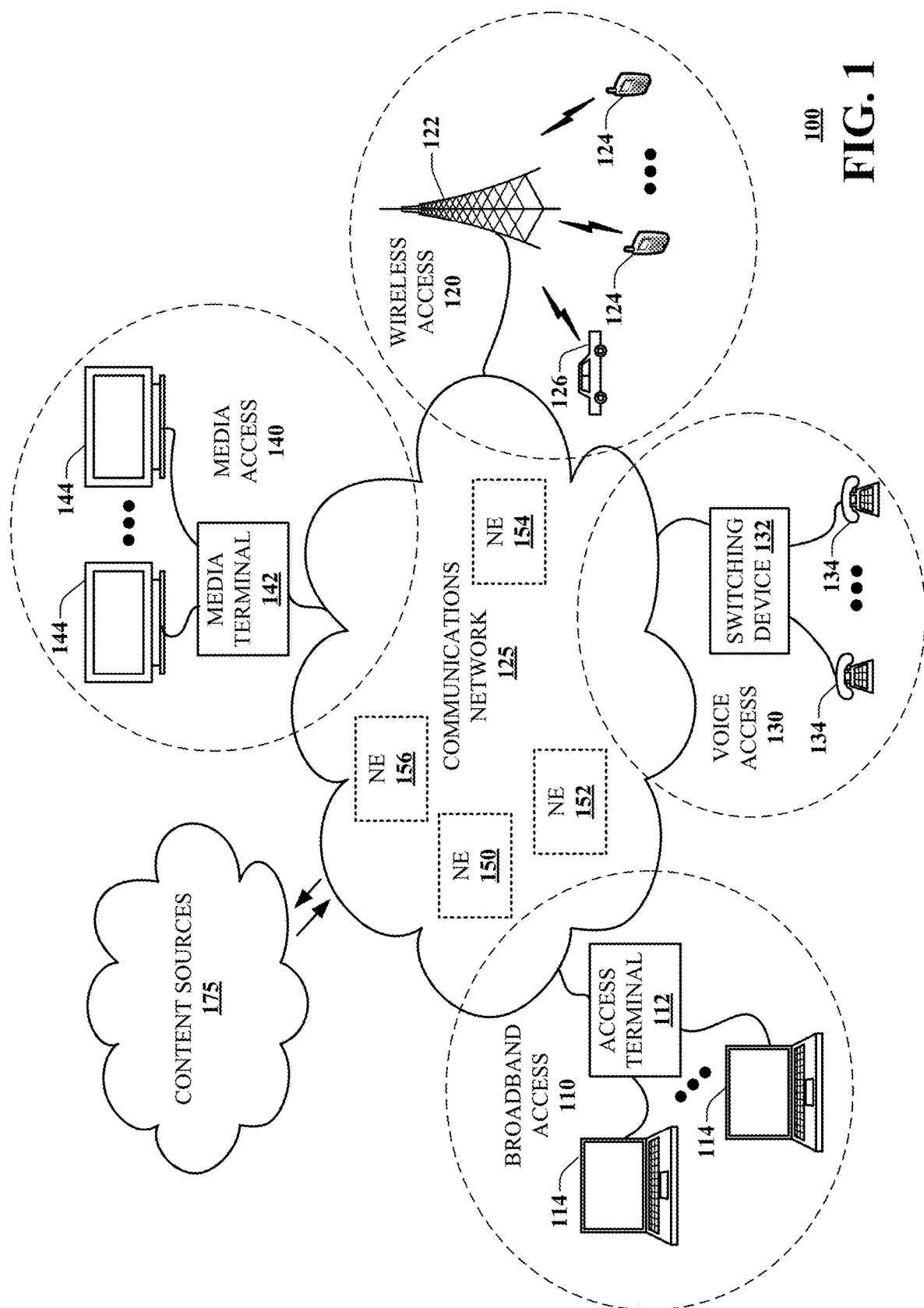
FIG. 1 is a block diagram illustrating an exemplary, non-limiting embodiment of a communications network in accordance with various aspects described herein.

Mobile network testing can be expensive, arduous, and time consuming, especially for tests that have to be frequently repeated. Important variables to test for are also oftentimes missed, which leads to the need for re-testing and thus additional effort and resources. As a result, present mobile network testing approaches generally yield minimal data for assessing the quality of user experience in different environments. Further, most services-related tests are conducted in static environments or set locations—that is, there is generally no testing while a test operator is in motion, and thus the essence of "mobility" is lost. In fact, including mobility in conventional testing approaches can increase test complexity to a point where it might even be cost prohibitive. Manual testing also raises safety concerns since test operators often have to physically travel to remote locations during overnight maintenance windows (e.g., 3 AM to 6 PM in the early morning).

The subject disclosure describes, among other things, illustrative embodiments of an automated network testing system or tool that is capable of implementing testing and validation of network services for a core network, an access network, and/or other portion(s) of a telecommunications network. In various embodiments, the automated network testing system may command and control (e.g., targeted and flexible) testing or deployment of test scenarios (e.g., one or more series of tests) at scale, involving user devices over one or more access networks, to characterize/assess the network infrastructure or subscriber experience. In exemplary embodiments, the system may operate at any time (e.g., in a discrete manner and on demand or in accordance with a schedule) and aggregate and analyze test results (e.g., at a centralized location) with minimal to no user intervention.

In various embodiments, the system may include a controller (e.g., a backend control server) that provides a control panel for network test management. The controller may interact with various user devices (e.g., smartphones, vehicles, Internet-of-Things (IoT) devices, and/or other types of equipment) that function as test devices or agents. In one or more embodiments, the controller may orchestrate network testing by remotely deploying, loading, installing, or embedding test scripts in one or more select user devices. In this way, a mobile network operator may leverage its vast resources and technology (in cloud computing and software) and configure numerous user devices for crowdsource-based testing. In exemplary embodiments, the user devices may include the mobile network operator's own user devices—e.g., worked-related employee or staff mobile smartphones, etc.—which allows the mobile network operator to easily run tests using its fleet of user equipment. In certain embodiments, the user devices may additionally, or alternatively, include customer equipment (e.g., mobile smartphones, etc.) associated with subscribers having subscriber agreements with the mobile network operator.

In some embodiments, the controller may command and control the execution of tests based on criteria or policy. In various embodiments, the criteria or policy may relate to time, such as where one or more tests are to be executed according to a time of day (e.g., a peak period during which infrastructure traffic exceeds a threshold, a peak period during which use of a particular application, such as, for instance, a video streaming application, exceeds a threshold, etc.) and/or according to a schedule (e.g., once every hour, once every five minutes, etc.). In certain embodiments, the criteria or policy may specify a number of repetitions or iterations, where one or more tests may be periodically repeated or repeated based on one or more conditions being satisfied—e.g., whenever a particular device application starts up, whenever a user device is determined to have moved a particular distance during travel (such as every one kilometer of movement), etc. In one or more embodiments, the criteria or policy may additionally, or alternatively, relate to subscriber characteristics (e.g., subscriber class, such as enterprise subscribers, fixed wireless subscribers, prepaid subscribers, etc.). In some embodiments, the criteria or policy may additionally, or alternatively, relate to user device or application/service type (e.g., device manufacturer; device hardware capabilities; particular services, such as voice services, video call services, etc.; particular applications, such as streaming applications, etc.). In certain embodiments, the criteria or policy may additionally, or alternatively, relate to location (e.g., by geographic region in which user device(s) may be physically located). In this way, the system may effect proactive network infrastructure testing in a safe and efficient manner and collect test results (which may include data points in various layers of the Open Systems Interconnection (OSI) model, such as the transport layer, network/Internet Protocol (IP) layer, application layer, etc.) in one or more data stores for processing. The immense amount of available test data for various network services in a variety of network environments allows for flexible processing and analyses, including processing for pass/fail conditions (e.g., according to threshold(s)) and comparisons with prior test results, to identify and diagnose issues in the network or to gain insight into the quality of user experience. Aggregated results may additionally, or alternatively, be submitted as big data for offline correlation analysis.

In various embodiments, the system may facilitate change-and-control testing, where a first test may be run to obtain baseline results, one or more changes may then be made to the network infrastructure, and a second test may be run to obtain post-change results. The baseline and post-change results may be subsequently compared to identify potential change-related issues.

It is to be understood and appreciated that the system is not limited to specific testing of a core network, but may be applied for any general network with infrastructure provisioning. For instance, in an ecosystem where products/services are deployed to end user devices, the system may generally be employed to deliver or deploy corresponding test cases to the end user devices, and leverage the relationship between the infrastructure provisioning and the test cases to characterize/assess the infrastructure or overall user experience with those products/services.

In various embodiments, the system may define a suite of tests and conduct them in a pipeline fashion. For instance, a test suite may include a speed test, a streaming test, and a pinging and browsing test. In this case, the system may split the testing into three waves—i.e., a first wave for speed test(s), a second wave for streaming test(s), and a third wave for pinging and browsing test(s). Splitting the testing in this manner can ensure that all tests are run properly and with minimal or no interference. The controller may monitor test progress to ensure that each wave is completed before the next wave begins. In certain embodiments, the system may (e.g., based on a policy or based on administrator instruction) choose to conduct the tests based on expected duration, such as in an order from shorter tests to longer tests. For instance, a test with an expected completion time of thirty seconds may be conducted prior to another test with an expected completion time of two minutes, and so on.

In exemplary embodiments, the system may be software driven and implemented in multiple components, including an app/agent configured to execute on user devices to facilitate testing, the aforementioned controller (e.g., control panel) for initiating and scheduling tests and presenting test reports or related information, a data store (or warehouse) for collecting/aggregating test results and interfacing with other backend systems, and an analytics engine for analyzing the data and providing data visualization.

In various embodiments, the app may include test software, scripts, and/or the like configured to be executed based upon remote commands from the controller/test system. The controller may present a list of executable tests and may provide options for configuring test parameters, policies, or criteria. As some examples, the control panel may present options for selecting individual test devices for a given test, selecting geographic regions for a given test (which may include or involve some or all of the user devices that are present in the geographic region(s)), selecting device type and/or device capabilities for a given test (which may include or involve some or all of the user devices that are of that type or that have those capabilities), scheduling tests, initiating tests, setting preferences for repeating of tests (e.g., based on time, based on distance, etc.), and so on. For instance, a selection of one or more geographic regions of interest (e.g., a cell site, a particular city or town, a "tracking area code," etc.) for a particular test can initiate the test on some or all of the user devices that are present in the geographic region(s).

In one or more embodiments, the controller may transmit one or more commands to the user devices to initiate a particular test. In certain embodiments, the app on (e.g., each of) the user devices may initiate the test based upon receiving the one or more commands. In some embodiments, the one or more commands may be accompanied by one or more status policies for executing the test. The one or more status policies may relate to battery power level, types of applications currently executing on the user device, types of services currently in use by the user device, and/or the like. In certain embodiments, the app running on a given user device may initiate the test in accordance with the one or more status policies—e.g., by ensuring that there is sufficient battery power (e.g., above a threshold value), that the user device is or is not currently conducting a call, that the user device is or is not currently executing a certain type of application (e.g., a video streaming or audio streaming application), and/or the like prior to running the test.

Each user device that is to execute a given test may run the test in the background (e.g., unbeknownst to a corresponding user), whether the user device is stationary or in motion. Where numerous (e.g., employee) smartphones of a particular type are located in a particular geographic region and are to execute a given test, none of the device users may even be aware of the test.

In various embodiments, the data store may obtain test data from each of the test devices in real-time or near real-time and aggregate the data for analysis. In one or more embodiments, the analytics engine may process the data using one or more algorithms/models (e.g., artificial intelligence (AI)/machine learning (ML) models) and output statistics or intelligence regarding the network.

Certain tests, such as speed- and streaming-related tests, may consume an enormous amount of data. Thus, in some embodiments, the controller may (e.g., periodically, within a threshold time period prior to initiating such a test, during peak traffic hours, or otherwise) monitor the capacity of the network, identify the potential load that such a test might add to the overall network, and, based on the potential added load, limit or cap the number of test devices that are to execute the test so as to minimize or reduce its overall impact on the network capacity.

In this way, exemplary embodiments enable proactive, yet passive, network testing and identification of network performance issues via ML techniques and simple leveraging of readily available user devices (i.e., crowdsourcing) throughout an organization (which can include thousands of user devices or more, especially in large organizations). This can be done with minimal to no impact to consumer experience and without a need for specific testers or expensive test equipment, which reduces overall operating costs. The new opportunities to perform testing in a variety of scenarios is generally not possible with conventional testing approaches. Collecting a large amount of test for various network services in a variety of network environments also provides insight into the quality of user experience and allows for identification and diagnosing/troubleshooting of issues in the network. The exemplary approach makes testing more flexible and provides further insight into issues that would otherwise be cost prohibitive to identify. Further, factoring in current capacity levels of the network prior to initiating a network test can also reduce any impacts that the test might have on network performance.

One or more aspects of the subject disclosure include a device, comprising a processing system including a processor, and a memory that stores executable instructions that, when executed by the processing system, facilitate performance of operations. The operations can include determining that one or more tests are to be executed for a core network of a telecommunications system. Further, the operations can include, based on the determining, transmitting one or more test initiation commands to a set of user equipment (UEs) of a plurality of UEs communicatively coupled to the core network, wherein the one or more test initiation commands cause the set of UEs to execute the one or more tests. Further, the operations can include obtaining, from the set of UEs, results associated with the one or more tests. Further, the operations can include analyzing the results based on one or more machine learning (ML) models to identify a network issue. Further, the operations can include, responsive to the analyzing, performing one or more actions to address the network issue.

One or more aspects of the subject disclosure include a non-transitory machine-readable medium, comprising executable instructions that, when executed by a processing system of a mobile user device including a processor, facilitate performance of operations. The operations can include receiving, from an automated network test server, a test execution policy and a test script for executing a test of a network infrastructure, wherein the mobile user device is included in a select set of mobile user devices for executing the test. Further, the operations can include, responsive to the receiving, processing the test execution policy to determine whether to execute the test. Further, the operations can include performing the test based on a determination to execute the test. Further, the operations can include obtaining results from the test and causing the results to be provided to the automated network test server for processing and analysis.

One or more aspects of the subject disclosure include a method. The method can comprise identifying, by a processing system including a processor, and based on a user command or a test schedule, that a suite of tests is to be executed for a core network infrastructure. Further, the method can include, based on the identifying, selecting, by the processing system, a set of mobile user devices of a plurality of candidate mobile user devices to execute the suite of tests. Further, the method can include determining, by the processing system, one or more test execution policies for the suite of tests. Further, the method can include providing, by the processing system, commands to the set of mobile user devices to execute the suite of tests in accordance with the one or more test execution policies. Further, the method can include, after the providing the commands, receiving, by the processing system, test results from the set of mobile user devices. Further, the method can include performing, by the processing system, offline analysis of the test results to characterize the core network infrastructure.

Other embodiments are described in the subject disclosure.

Referring now to FIG. 1, a block diagram is shown illustrating an example, non-limiting embodiment of a system 100 in accordance with various aspects described herein. For example, system 100 can facilitate, in whole or in part, automated command and control testing or deployment of test scenarios at scale to characterize a core network infrastructure and/or subscriber experience. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communications network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or another communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
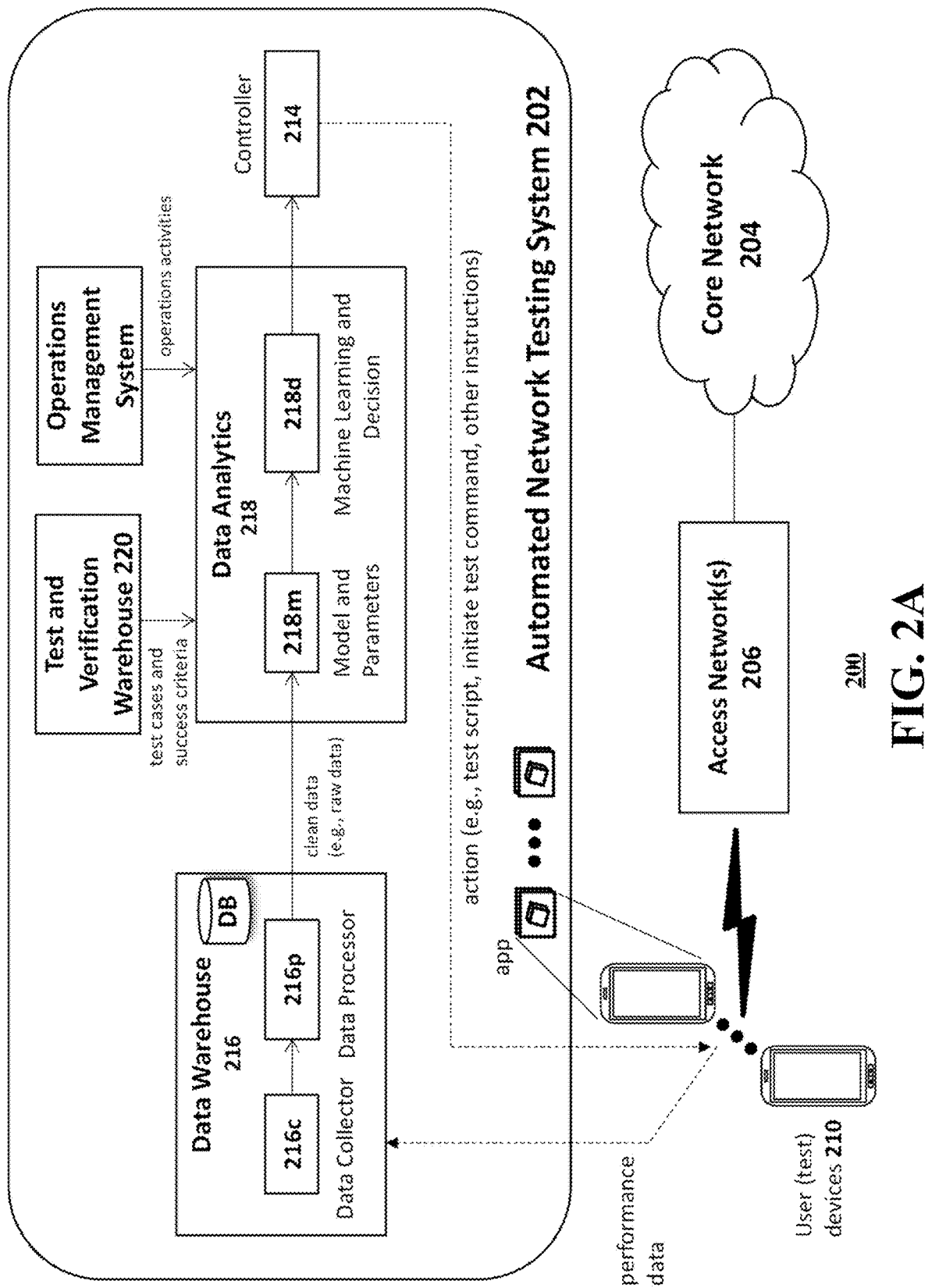
FIG. 2A is a block diagram illustrating an example, non-limiting embodiment of a system functioning within, or operatively overlaid upon, the communications network of FIG. 1 in accordance with various aspects described herein.

FIG. 2A is a block diagram illustrating an example, non-limiting embodiment of a network system 200 functioning within, or operatively overlaid upon, the communications network 100 of FIG. 1 in accordance with various aspects described herein. As shown in FIG. 2A, the system 200 may include an automated network testing system 202, a core network 204, and an access network 206.

In various embodiments, the access network 206 may include a wireless radio access network (RAN), a Wi-Fi network, and/or a wireline network. The access network 206 may include network resources, such as one or more physical access resources and/or one or more virtual access resources. Physical access resources can include base station(s) (e.g., one or more eNodeBs, one or more gNodeBs, or the like), one or more satellites or uncrewed aerial vehicles (UAVs), one or more Gigabyte Passive Optical Networks (GPONs) or related components (e.g., Optical Line Terminal(s) (OLT), Optical Network Unit(s) (ONU), etc.), and/or the like. A base station may employ any suitable radio access technology (RAT), such as LTE, 5G, 6G, or any higher generation RAT. One or more edge computing devices (e.g., multi-access edge computing (MECs) devices or the like) may also be included in or associated with the access network 206.

Presently, there are ongoing efforts to create technical specifications for 5G wireless wireline convergence (WWC) architectures, where fixed wireless and wireline access networks are brought on to leverage the common 5G core (5GC). For instance, an access gateway function (AGF) has been defined to provide certain hierarchical traffic shaping and policing functionality for a fixed network (FN) and 5G residential gateway(s) (RG(s)) served from a 3rd Generation Partnership Project (3GPP) user plane function (UPF), where a policy control function (PCF) and an authentication server function (AUSF) are shared across mobile, fixed wireless, and wireline access networks. In some embodiments, wireline access resources in the access network 206 may be associated with one or more AGFs that facilitate communications with the core network 204 (e.g., enabling wireline-based systems to leverage a 5G core or the like).

Virtual access resources can include a voice service system (e.g., a hardware and/or software implementation of voice-related functions), a video service system (e.g., a hardware and/or software implementation of video-related functions, such as coder-decoder or compression-decompression (CODEC) components or the like), a security service system (e.g., a hardware and/or software implementation of security-related functions), and/or the like. In one or more embodiments, the access network 206 may include any number/types of physical/virtual access resources and various types of heterogeneous cell configurations with various quantities of cells and/or types of cells.

In certain embodiments, the access network 206 may be implemented as a virtual RAN, where radio/wireline functions are implemented as general-purpose applications/apps that operate in virtualized environments and interact with physical resources either directly or via full/partial hardware emulation. Virtualized software radio applications can be delivered as a service and managed through a cloud controller. Here, base stations may be implemented as (e.g., passive) distributed radio elements connected to a centralized baseband processing pool.

In various embodiments, the core network 204 may include various network devices and/or systems that provide a variety of functions. Examples of functions provided by, or included, in the core network 204 include an access mobility and management function (AMF) configured to facilitate mobility management in a control plane of the network system 200, a UPF configured to provide access to a data network, such as a packet data network (PDN), in a user (or data) plane of the network system 200, a Unified Data Management (UDM) function, a Session Management Function (SMF), a PCF, and/or the like. The core network 204 may be in communication with one or more other networks (e.g., one or more content delivery networks (CDNs)), one or more services, and/or one or more devices. In various embodiments, the core network 204 may include one or more devices implementing other functions, such as a master user database server device for network access management, a PDN gateway server device for facilitating access to a PDN, and/or the like. The core network 204 may include various physical/virtual resources, including server devices, virtual environments, databases, and so on. The core network 204 may include or be implemented in a 3G core, a 4G/long term evolution (LTE) core, a 5G core, a 6G core, or a core for a higher generation technology.

In certain embodiments, the core network 204 may be implemented in a software-defined network (SDN). An SDN controller may allow the network system 200 to separate control plane operations from data plane operations, and can enable layer abstraction for separating service and network functions or elements from physical network functions or elements. In one or more embodiments, the SDN controller may coordinate networking and provisioning of applications and/or services. The SDN controller may manage transport functions for various layers within the network system 200, and can access application functions for layers above the network system 200. The SDN controller may provide a platform for network services, network control of service instantiation and management, as well as a programmable environment for resource and traffic management. The SDN controller may also permit a combination of real-time data from the service and network elements with real-time, or near real-time, control of a forwarding plane. In various embodiments, the SDN controller may enable flow set up in real-time, network programmability, extensibility, standard interfaces, and/or multi-vendor support.

In exemplary embodiments, the automated network testing system 202 may be implemented in a standalone system within the overall network. In alternate embodiments, the automated network testing system 202 may be implemented within the core network 204 or in another backend portion of the network communicatively coupled with the core network 204. In one or more embodiments, the automated network testing system 202 may be configured to facilitate testing and validation of network services for the core network 204, the access network 206, and/or other portion(s) of the telecommunications network. In various embodiments, the automated network testing system 202 may be software driven and implemented in multiple components, including an app configured to execute on user devices 210, a controller (e.g., control panel) 214 for initiating and scheduling tests and presenting test reports or related information, a data store (or warehouse) 216 for collecting/aggregating test results and interfacing with other backend systems, and an analytics engine 218 for analyzing the data and providing data visualization.

The user devices 210 may be associated with a user (e.g., employees or contractors of an operator or provider of the core network 204 and/or access network(s) 206; subscribers/customers of the provider's network), and may include one or more devices capable of receiving, generating, storing, processing, and/or providing data (e.g., audio data, video data, XR data, text data, control data, etc.) relating to the automated network testing system 202. For example, a user device 210 can include a communication and/or computing device, such as a mobile phone (e.g., a smart phone, a radiotelephone, etc.), a laptop computer, a tablet computer, a handheld computer, a display device, a gaming device, a wearable communication device (e.g., a smart wristwatch, a pair of smart eyeglasses, media-related gear (e.g., a pair of AR, VR, MR glasses, a headset, headphones, and/or the like), etc.), a similar type of device, or a combination of some or all of these devices.

In one or more embodiments, the controller 214 may execute action(s) dictated by a machine learning decision (MLD) component 218d of the analytics engine 218 or instructed manually via a control panel/interface. The action(s) may include initiation of one or more tests at one or more user devices 210. In certain embodiments, the controller 214 may present (e.g., on the control panel) a list of executable tests (e.g., on-demand core service tests) and may provide (e.g., via the control panel) user options for configuring test parameters, setting certain constraints (e.g., time constraints for running a test, time constraints for time-outs, etc.), selecting individual user device(s) 210 for one or more tests, selecting geographic region(s) for one or more tests (e.g., where the test(s) may be run only on user devices 210 located within the geographic region(s)), selecting a device type and/or device capabilities for one or more tests (e.g., only those devices running a particular operating system (OS), only those devices that have more than a threshold amount of available memory, etc.), scheduling tests, initiating tests, setting preferences for repeating of tests (e.g., timing for repeats, travel distance parameters for repeats, etc.), and/or the like. In any case, the controller 214 may, as part of initiating a given test, cause test-related commands/data to be transmitted to (and/or loaded on) the selected user devices 210. In some embodiments, the controller 214 may employ data analytic tool(s) to generate and present (e.g., on the control panel) one or more heatmaps based on test results and/or other data. In various embodiments, the controller 214 may employ crowd sourcing tool(s) for identifying, tracking, and/or managing candidate user devices 210 for various tests. In certain embodiments, the controller 214 may coordinate with the MLD component 218d to perform analytics or effect crowdsource-based testing.

In exemplary embodiments, a data collector 216c may obtain test-related data from user devices 210, which may be processed by a data processor 216p. Such processing may include data cleaning (e.g., removal of headers or other predefined extraneous information, elimination of determined erroneous data, etc.), calculation of metrics in accordance with defined formulas or rules, conversion of the data into preset (e.g., workable) metrics, and/or the like.

In certain embodiments, a function (e.g., script) may determine statistics or information (including, for instance, "mobile"-related information), which may be useful for identifying potential issues or points of failure in a network infrastructure. For instance, the information may include a base station (e.g., eNB, gNB, etc.) corresponding to a reported cell ID in test results provided by a user device 210 executing a test, a data center associated with the base station, a date/time of the test, a location at which the test was run, call data records (CDR) associated with the user device 210, a serving gateway (SGW) and/or a packet data network gateway (PGW) that the user device 210 was communicating with during the test, a mobility management entity (MME) associated with the test, an NTC associated with the test, and/or the like. In one or more embodiments, the data store 216 may interface with one or more backend systems/servers to identify or obtain some or all of the aforementioned information, and may populate the information (e.g., in a data structure) for use by the analytics engine 218.

In various embodiments, the MLD component 218d may determine when to initiate test(s), such as in accordance with user commands, operational schedules, preset test schedules, or the like. The MLD component 218d may operate based on model outputs from a model(s)/parameter(s) (MP) component 218m. The MLD component 218d may (e.g., periodically, within a threshold time period prior to initiating a test, during peak traffic hours, or otherwise) monitor the capacity of the network, identify the potential load that such a test might add to the overall network, and limit or cap the number of test devices 210 that are to execute the test so as to minimize or reduce its overall impact on the network capacity. For instance, where the MLD component 218d determines that execution of a test by a hundred user devices 210 may cause the network capacity to drop below a threshold value, the MLD component 218d may initiate testing on only ninety-nine of the user devices 210 or ninety-eight of the user devices 210, etc.

In one or more embodiments, the MLD component 218d may identify the status of some or all of the user devices 210 (such as ones selected to execute a given test) and determine whether to involve these user devices 210 in the test. In certain embodiments, the MLD component 218d may coordinate with the instance of the app running on a given user device to identify the device's power status (e.g., to ensure that it is above a threshold value needed for the test to run successfully) and/or to ascertain an operational status of the device (e.g., to ensure that the user device is not currently conducting a call, to ensure that the user device is not currently executing a certain type of application (e.g., video streaming or audio streaming application), and/or the like, which may interfere with the test). In a case where a given user device 210 is not an ideal candidate for a test (e.g., has insufficient remaining power, is currently conducting a video call, etc.), the MLD component 218*d* may avoid instructing the user device 210 to run the test, or alternatively, the app on the user device 210 may refrain from running the test despite receiving an instruction from the controller 214 to do so. In alternate embodiments, the MLD component 218*d* may provide one or more status policies—e.g., regarding the aforementioned minimum required battery power level, currently-executed applications, etc.—to the user device 210 for enforcement, where the app thereon may decide whether to initiate the test in accordance with those policies.

In various embodiments, the app executing on a given user device 210 may be configured to run one or more tests in the background with minimal to no user awareness or intervention. In exemplary embodiments, the app may run a given test within the above-described constraints of time, distance, available device power, etc. In cases where a series of tests (e.g., two or more waves of different tests) are to be executed, each of the tests may be associated with its own status policies or constraints. Thus, where a given user device 210 is selected to run the series of tests, the app thereon may execute each test in accordance with the associated status policies or constraints. For instance, where a first test is not associated with a minimum battery level requirement, where a second test is associated with such a minimum battery level requirement, and where the app on the user device 210 determines that its battery status fails to meet the minimum requirement, the app may execute the first test (since it is not associated with a minimum battery level requirement), but may or may not execute the second test (due to its insufficient battery level).

In exemplary embodiments, the app may, based upon executing a given test, provide outputs or results of the test to the data store 216. In certain embodiments, the app may additionally provide other information to the data store 216, such as location information for the user device 210, information regarding signal strength(s) associated with one or more detected access points positioned nearby the user device 210, information regarding a RAT utilized by the user device 210, a cell ID, date/time information, and/or other device-, test-, or network-related information.

In exemplary embodiments, the MP component 218*m* may update model(s) based on collected "clean" data from the data processor 216*p* and/or based on expected results (e.g., success criteria) for specified test/use cases provided by a test and verification store 220. Model(s) may be (e.g., continuously) updated based on new training data as it becomes available.

In one or more embodiments, the MLD component 218*d* may leverage the model(s)/parameter(s) to perform a variety of functions. In certain embodiments, the MLD component 218*d* may be trained to determine whether the results are satisfactory (e.g., satisfy appropriate threshold(s))—e.g., by detecting certain changes based on signature (e.g., where a key performance indicator (KPI) value changes by more than a particular amount, such as, for instance, more than one standard deviation relative to a prior/accepted value). In various embodiments, the MLD component 218*d* may compare test results with the success criteria and identify next steps as needed—e.g., issuing of warning(s) to an administrator on the control panel, instantiating resources to address any determined capacity deficiencies, etc. In some embodiments, the MLD component 218*d* may perform root-cause analysis of network issues, generate network adjustment recommendations for identified network issues, and/or proactively effect resolution of identified network issues. For instance, where the MLD component 218*d* identifies latency issues for multiple user devices 210 that ran a latency test, the MLD component 218*d* may identify a point of congestion (e.g., a particular base station of an access network 206 or a particular PGW in the core network 204 that all of those user devices 210 are connected to), and provide recommendations (e.g., on the control panel) to address the congestion or otherwise coordinate with other systems in the network to proactively effect the resolution. Resolutions may include dispatching UAV-based RAN(s) to offload a congested terrestrial base station, prioritizing/deprioritizing certain traffic or traffic types for certain subscribers, instantiating/deactivating certain physical or virtual resources, etc. In certain embodiments, the MLD component 218*d* may utilize crowdsourcing analytics technique(s) to facilitate its analysis of test results.

In some embodiments, the MLD component 218*d* may generate graphs, tables, maps (e.g., heatmaps), timelines, etc. to facilitate test result/data visualization by an administrator. As an example, a heatmap may present parameter values in accordance with thresholds, such as, for instance, a green graphic for network latency that is less than 30 milliseconds (ms), a yellow graphic for network latency that is between 30 ms and 75 ms, and red for network latency that is above 75 ms. Providing test result/data visualization facilitates efficient administrator synthesis of underlying issues, including pinpointing of any geographic locations or specific network resources that are likely to be the root cause of a problem. In various embodiments, the MLD component 218*d* may distinguish certain test results and classify or sort them based on various categories (e.g., latencies based on certain services, latencies associated with certain locations, latencies associated with use of certain user device technologies, RATs, etc., and so on).

In some cases, expected test results may be fluid or change over time. In various embodiments, the MLD component 218*d* may be configured to conduct periodic testing to identify changes in expected results, which allows for trend analysis or improved understanding of infrastructure constraints or user experience over time.

It is to be understood and appreciated that the automated network testing system 202 may be capable of conducting various types of tests. The types of tests may differ depending on the industry, the particular use case, etc. In the case of a telecommunications network, the automated network testing system 202 may be configured to perform service tests for a core network, a RAN, or other parts of the overall network. In various embodiments, the automated network testing system 202 may be configured to perform connectivity tests, technology-related tests, IP address detections/tests, uniform resource locator (URL) reachability tests, short message service (SMS)-related tests, e-mail tests, location/address detections, and so on. For instance, an example test scenario may involve testing a particular application (e.g., a video streaming app) between different device platforms (e.g., a first set of devices that use one type of OS versus a second set of devices that use another type of OS). Here, the test may be run on the first set of devices and the second set of devices independently (whether simultaneously, near-simultaneously, or at different times), where results from the tests can be analyzed to compare user experience across the different platforms.

As described above, one or more tests may be selectively run for a particular geographic region to assess or characterize the infrastructure elements in that region. In some embodiments, in a case where a test scenario is currently being run for a select geographic region, and where a mobile user device 210 (that was previously not a candidate to run the test) travels and enters into the geographic region, the relevant test(s) may be initiated for that user device 210. For instance, in certain embodiments, the automated network testing system 202 (e.g., the controller 214 and/or the data analytics engine 218) may detect the movement or mobility of user devices 210 by obtaining data (e.g., periodically or based on reported changes) from one or more systems in the core network 204 and/or the access network 206, and utilize the data to identify any user devices 210 that have entered the subject geographic region. Continuing the example, the automated network testing system 202 may, based upon identifying that a user device 210 has entered the geographic region during a test scenario, decide to initiate testing for the user device 210 and cause test initiation command(s) to be transmitted to that user device 210. Here, the automated network testing system 202 may factor in test duration(s) in deciding whether to initiate testing. As an example, if a substantial portion of the test(s) has yet to be completed for the geographic region (e.g., the test(s) have been run for less than a threshold amount of time), the automated network testing system 202 may decide to initiate the test(s) for that user device 210. As another example, if a substantial portion of the test(s) has already been run for the geographic region (e.g., more than a threshold time has passed since the test(s) were initiated), the automated network testing system 202 may decide not to initiate the test(s) for that user device 210. In this case, if the test(s) are to be repeated (e.g., once every ten minutes for a two-hour period) per policy, the automated network testing system 202 may wait until the current run of the test(s) is completed before sending test initiation command(s) to the user device 210.

In certain embodiments, in a case where the automated network testing system 202 detects that a selected user device 210 has exited a subject geographic region during a test run, the automated network testing system 202 may either permit the user device 210 to continue the test and utilize test results from that user device 210 or, alternatively, issue a test termination command to the user device 210 and ignore some or all of the test results received from that user device 210.

Figure 2B:
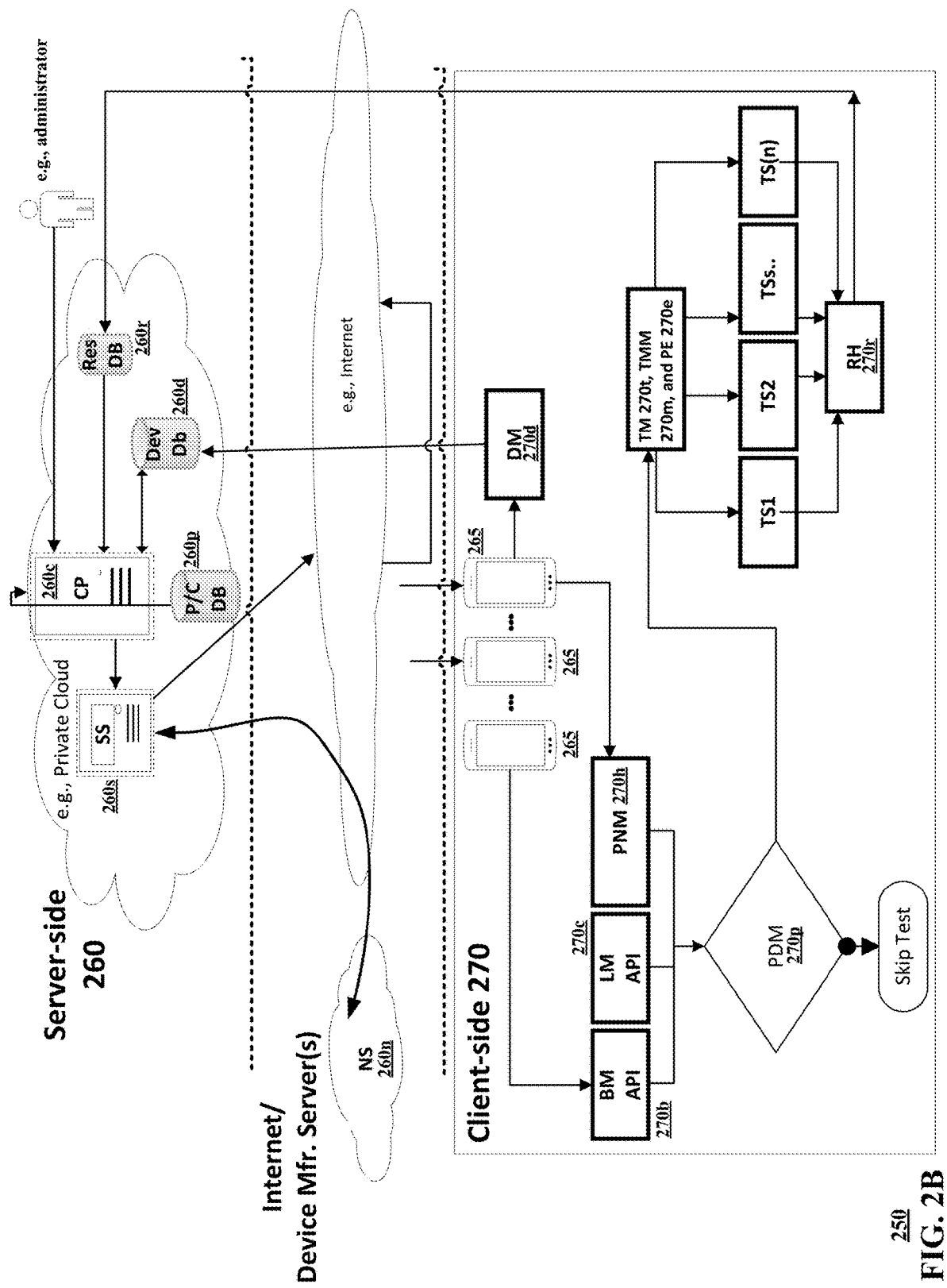
FIG. 2B is a block diagram illustrating an example, non-limiting embodiment of an automated network testing system in accordance with various aspects described herein.

FIG. 2B is a block diagram illustrating an example, non-limiting embodiment of an automated network testing system 250 in accordance with various aspects described herein. In various embodiments, a portion of, or an entirety of, the system 250 may be similar to, may be included in, may incorporate, or may otherwise correspond to the system 202 of FIG. 2A. Some or all of the functions described below may be the same as or similar to that described above with respect to FIG. 2A. Certain functions described below may be different from (e.g., implemented differently from or implemented in addition to) various functions described above with respect to FIG. 2A. FIG. 2C depicts an illustrative embodiment of a device registration method 280 in accordance with various aspects described herein. FIG. 2D depicts an illustrative embodiment of a test execution method 290 in accordance with various aspects described herein.

As shown in FIG. 2B, the system 250 may be implemented in a server-client based architecture, including a server-side system 260 and a client-side system 270. The server-side system 260 may include a control panel server 260c configured to provide various functions, including, but not limited to, a policy management and selection function (290b of FIG. 2D), a configuration management function, an app update management function, preparation for and/or initiation/scheduling of tests (290a, 290c, 290d of FIG. 2D), generation of test result reports, data analytics (or coordination of such analytics), control panel management/display, and/or the like.

In one or more embodiments, the server-side system 260 may include a signaling server 260s configured to receive test initiation requests from the control panel server 260c, format such requests (e.g., for a target protocol, such as Hypertext Transfer Protocol Secure (HTTPS) or the like), identify device manufacturer notification server(s) upon which to serve such requests, and transmit (290e of FIG. 2D) such requests to a notification server 260n.

In some embodiments, the server-side system 260 may include, or interface with, the notification server 260n. The notification server 260n may be configured to receive test initiation requests, extract requested test parameters, identify target device manufacturer notification server(s) for serving the requests, and transmit the requests to the identified target device manufacturer notification server(s) for subsequent transmission (e.g., over the Internet or other communication medium) to targeted user devices 265 to execute the test(s). In various embodiments, the server-side system 260 may alternatively include, or interface with, individual device manufacturer notification servers, in which case some or all of the functionality of the notification server 260n maybe implemented or included in the individual device manufacturer notification servers. In certain embodiments, the system 250 may exclude notification servers. In these embodiments, the signaling server 260s may communicate (e.g., directly) with the individual user devices 265 to coordinate testing.

In various embodiments, the server-side system 260 may include a policy and configuration data store 260p configured to store configuration data (e.g., IP addresses, ports, URLs, timer settings, device-related limits or constraints, etc.) and test-related policies that are to be enforced. In various embodiments, the control panel server 260c may interact with the policy and configuration data store 260p to derive or construct test requests.

In certain embodiments, the server-side system 260 may include a results data store 260r configured to obtain and store test results (e.g., in encrypted form and/or in redundant fashion). In certain embodiments, the control panel server 260c and/or one or more other systems may retrieve data from the results data store 260r for data analytics.

In some embodiments, the server-side system 260 may include a device information data store 260d that stores various information, including device-related information (e.g., OS version, make, model, identifiers, etc.), subscription information (e.g., whether a device is subscribed to a particular service or not), status information (e.g., whether the device is currently in a suitable state for testing, such as being in an appropriate location, having a requisite battery power level, currently executing/utilizing or not executing/ utilizing certain applications/services, etc.).

In various embodiments, the client-side system 270 may be constructed as an intermediate system that interconnects the server-side system 260 and numerous user devices 265. In certain embodiments, some or all of the client-side system functionality may be implemented within each user device 265, such as within an app on each user device 265 (similar to the app described above with respect to FIG. 2A) or within one or more systems associated with the app on each user device 265. In these embodiments, each user device 265 may then function as a standalone test device 265 that communicates with the server-side system 260 to execute requested tests with or without any additional intermediate system.

The client-side system 270 may include a device manager/function 270d configured to determine current state(s) of the user device(s) 265 (e.g., by obtaining OS version, app version, current token data, prior test information, such as the last time that a test was run, etc.), and may provide information regarding the current state to the server-side system 260 (e.g., the device information data store 260d). In various embodiments, the device manager/function 270d may facilitate the device registration process 280 of FIG. 2C, including pushing (280a of FIG. 2C) the app to user device(s) 265 for installation, where the app may be installed and launched (280b of FIG. 2C), and where an OS therein may register the app (280c of FIG. 2C) and create and send token(s) along with the date, time, version, etc. (280d of FIG. 2C) to the device manager/function 270d for storage and/or forwarding (280e of FIG. 2C) to the signaling server 260s.

In one or more embodiments, the client-side system 270 may include a policy decision manager/function 270p configured to receive test request(s) (290f of FIG. 2D) and check (290g of FIG. 2D) received policies (e.g., one or more status policies described above with respect to FIG. 2A) associated with requested test(s) to determine whether to proceed with the test(s).

In some embodiments, the client-side system 270 may include a test manager/function 270t configured to instruct or cause the user device(s) 265 to run requested test(s) (e.g., TS1 to TS(n)) according to the determination by the policy decision manager/function 270p, and instruct a test metadata manager/function 270m to apply policy data (e.g., relating to test run date/time, app version(s), device platform(s), user device movement(s), radio technologies, tracking area code(s), etc.) for execution of the test(s).

In certain embodiments, the client-side system 270 may include a policy enforcer manager/function 270e configured to enforce (290h of FIG. 2D) the received policies in a case where the policy decision manager/function 270p determines to proceed with the test(s). The tests TS1 to TS(n) may be run (290i of FIG. 2D) as enforced by the policy enforcer manager/function 270e.

In various embodiments, the client-side system 270 may include a battery manager/function 270b configured to detect battery power level(s) of the user device(s) 265, compare the detected level(s) to threshold(s) (e.g., specified in received policies), and report comparison result(s) to the policy decision manager/function 270p. The client-side system 270 may include a location manager/function 270c configured to determine the location of the user device(s) 265 (e.g., global positioning system (GPS)-based coordinate(s)) and report the determination(s) to the policy decision manager/function 270p. The client-side system 270 may include a push notification handler 270h configured to handle or process push notifications (e.g., via call backs called by a system) and that generally functions as an entry point for launching the app(s) to run test(s) (e.g., if the app(s) are terminated for any reason).

In one or more embodiments, the client-side system 270 may include a results handler 270r configured to receive or collect test results (e.g., from the user device(s) 265 for each test wave), process the test results into appropriate form for delivery, and deliver the formatted test results (e.g., in encrypted form) to the server-side system 260 (e.g., the results data store 260r) over the Internet or other communication medium (290j of FIG. 2D).

It is to be understood and appreciated that the quantity and arrangement of systems, processors, engines, controllers, data stores, apps, devices, servers, networks, and functions shown in each of FIGS. 2A and 2B are provided as an example. In practice, there may be additional systems, processors, engines, controllers, data stores, apps, devices, servers, networks, and/or functions, fewer systems, processors, engines, controllers, data stores, apps, devices, servers, networks, and/or functions, different systems, processors, engines, controllers, data stores, apps, devices, servers, networks, and/or functions, or differently arranged systems, processors, engines, controllers, data stores, apps, devices, servers, networks, and/or functions than those shown in FIGS. 2A and 2B. For example, the systems 200 and 250 can include more or fewer systems, processors, engines, controllers, data stores, apps, devices, servers, networks, and/or functions, etc. In practice, therefore, there can be hundreds, thousands, millions, billions, etc. of systems, processors, engines, controllers, data stores, apps, devices, servers, networks, and/or functions. In this way, example systems 200 and 250 can coordinate, or operate in conjunction with, a set of systems, processors, engines, controllers, data stores, apps, devices, servers, networks, and/or functions and/or operate on data sets that cannot be managed manually or objectively by a human actor. Furthermore, two or more systems, processors, engines, controllers, data stores, apps, devices, servers, networks, and/or functions may be implemented within a single system, processor, engine, controller, data store, app, device, server, network, or function, or a single system, processor, engine, controller, data store, app, device, server, network, and function may be implemented as multiple systems, processors, engines, controllers, data stores, apps, devices, servers, networks, or functions. Additionally, or alternatively, a set of systems, processors, engines, controllers, data stores, apps, devices, servers, networks, or functions may perform one or more functions described as being performed by another set of systems, processors, engines, controllers, data stores, apps, devices, servers, networks, and/or functions.

It is also to be understood and appreciated that, although FIGS. 2A-2D might be described above as pertaining to various processes and/or actions that are performed in a particular order, some of these processes and/or actions may occur in different orders and/or concurrently with other processes and/or actions from what is depicted and described above. Moreover, not all of these processes and/or actions may be required to implement the systems and/or methods described herein.

Referring now to FIG. 3, a block diagram 300 is shown illustrating an example, non-limiting embodiment of a virtualized communications network in accordance with various aspects described herein. In particular, a virtualized communications network is presented that can be used to implement some or all of the subsystems and functions of system 100, the subsystems and functions of systems 200 and 250, and methods 280 and 290 presented in FIGS. 1 and 2A-2D. For example, virtualized communications network 300 can facilitate, in whole or in part, automated command and control testing or deployment of test scenarios at scale to characterize a core network infrastructure and/or subscriber experience.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communications network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward substantial amounts of traffic, their workload can be distributed across a number of servers—each of which adds a portion of the capability, and which creates an overall elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
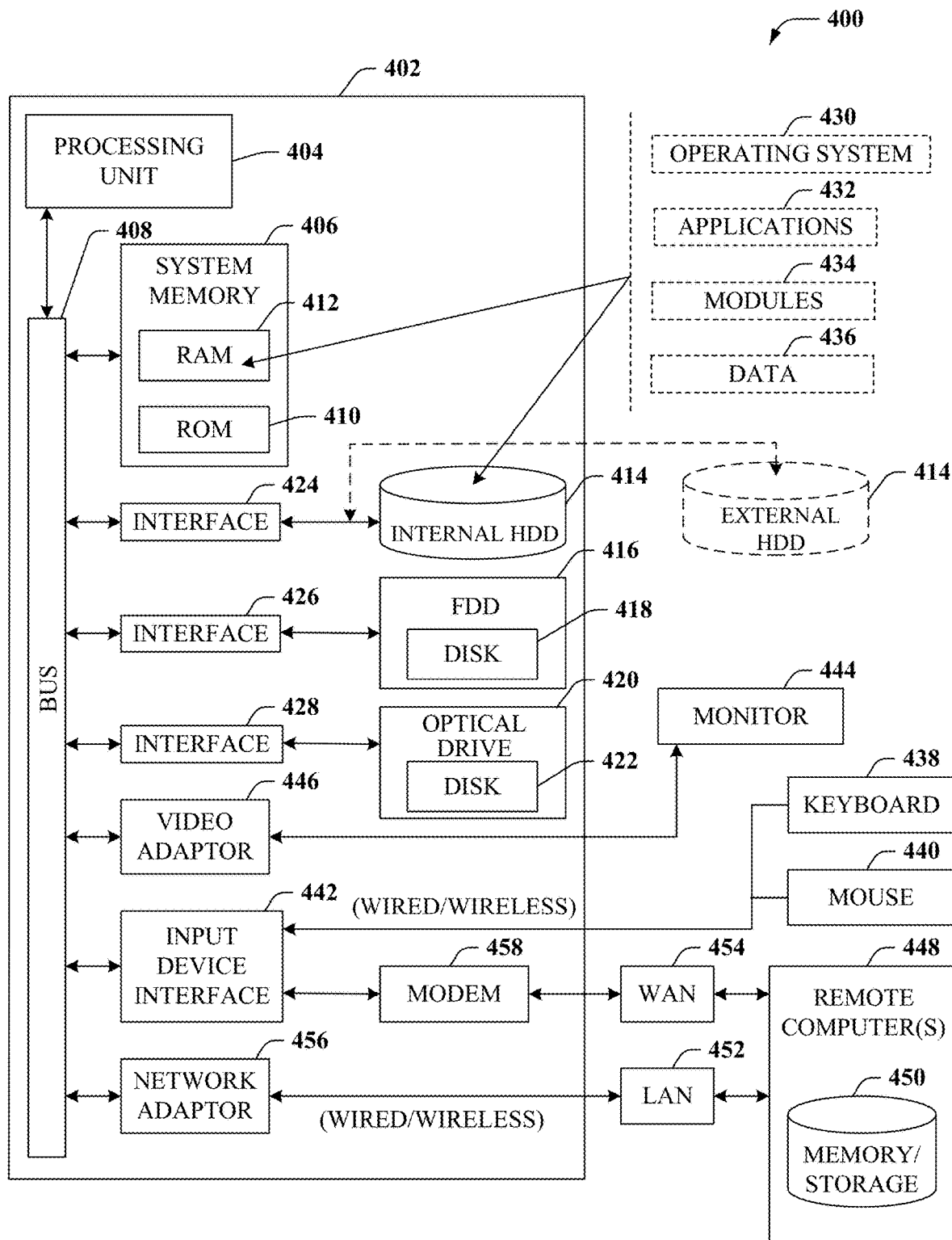
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate, in whole or in part, automated command and control testing or deployment of test scenarios at scale to characterize a core network infrastructure and/or subscriber experience.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network.

In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communications network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
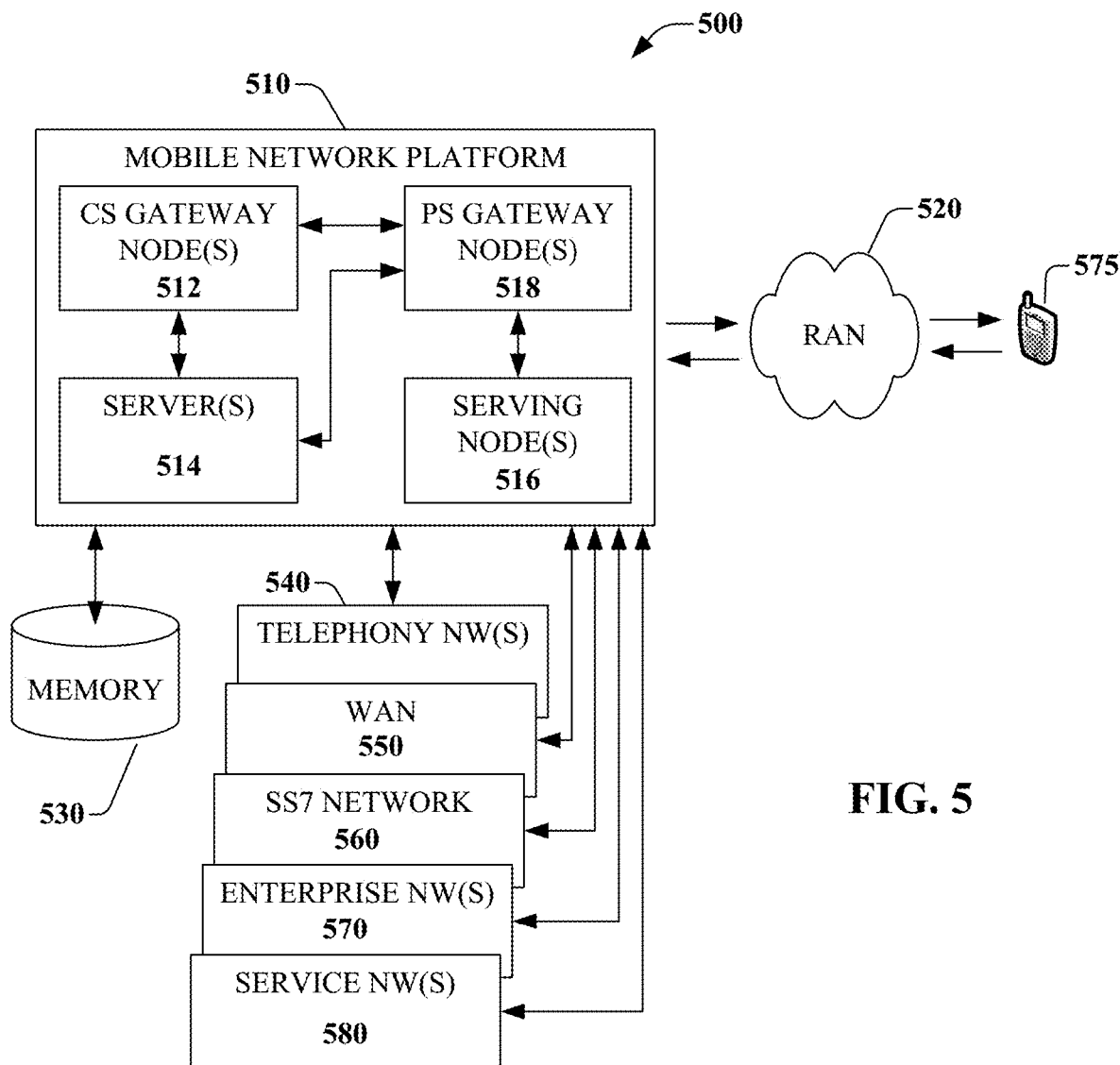
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate, in whole or in part, automated command and control testing or deployment of test scenarios at scale to characterize a core network infrastructure and/or subscriber experience. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as distributed antenna networks that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
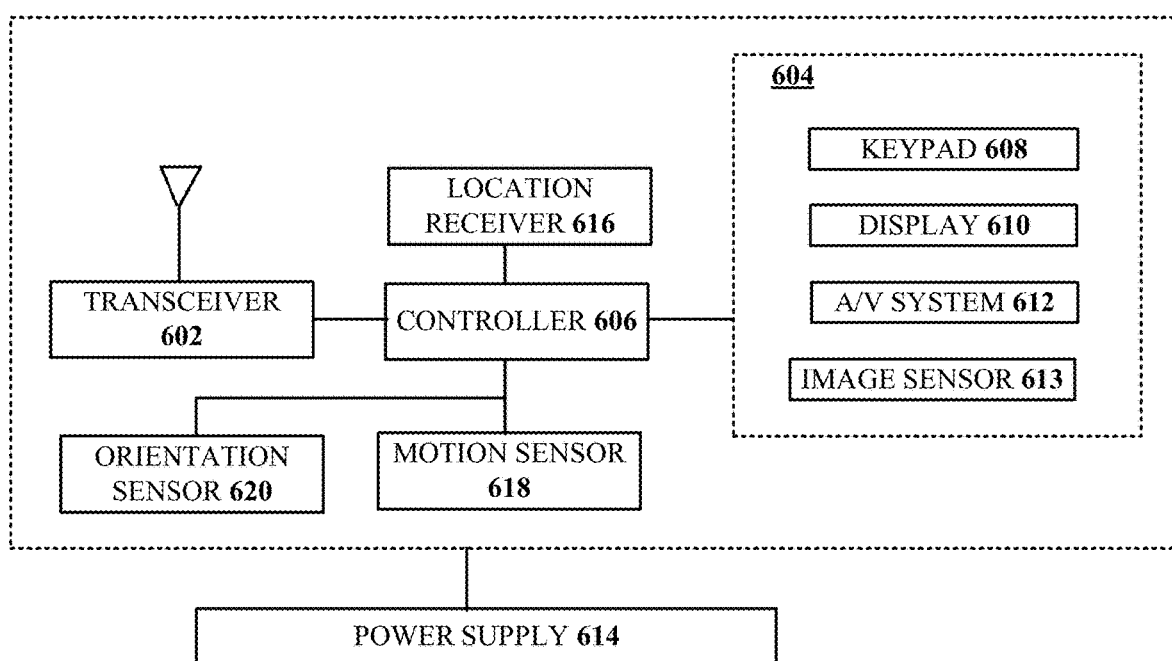
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via communications network 125. For example, computing device 600 can facilitate, in whole or in part, automated command and control testing or deployment of test scenarios at scale to characterize a core network infrastructure and/or subscriber experience.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

In various embodiments, threshold(s) may be utilized as part of determining/identifying one or more actions to be taken or engaged. The threshold(s) may be adaptive based on an occurrence of one or more events or satisfaction of one or more conditions (or, analogously, in an absence of an occurrence of one or more events or in an absence of satisfaction of one or more conditions).

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communications network) can employ various AI-based schemes for conducting various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communications network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to," "coupled to," and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
determining that one or more tests are to be executed for a core network of a telecommunications system;
based on the determining, transmitting one or more test initiation commands to a set of user equipment (UEs) of a plurality of UEs communicatively coupled to the core network, wherein the one or more test initiation commands cause the set of UEs to execute the one or more tests;
obtaining, from the set of UEs, results associated with the one or more tests;
analyzing the results based on one or more machine learning (ML) models to identify a network issue; and
responsive to the analyzing, performing one or more actions to address the network issue.

2. The device of claim 1, wherein each UE of the plurality of UEs corresponds to an individual user that is functioning within an organization of a provider of the telecommunications system, and wherein the one or more tests are executed in background processing on each UE in the set of UEs.

3. The device of claim 1, wherein the one or more actions comprise triggering an alarm to alert a network administrator to the network issue, causing an uncrewed aerial vehicle (UAV)-based radio access network (RAN) to be dispatched to a particular area, prioritizing or deprioritizing certain traffic or traffic types for certain subscribers, instantiating or deactivating certain physical or virtual network or access resources, or a combination thereof.

4. The device of claim 1, wherein the determining that the one or more tests are to be executed is based on an administrator command or a predefined schedule.

5. The device of claim 1, wherein the determining that the one or more tests are to be executed is based on one or more policies.

6. The device of claim 1, wherein the determining that the one or more tests are to be executed is performed by a control panel function, wherein the control panel function provides options for configuring test parameters, policies, or criteria, selecting individual UEs of the plurality of UEs for the one or more tests, selecting geographic regions for the one or more tests, selecting device type or device capabilities for the one or more tests, scheduling the one or more tests, initiating the one or more tests, setting preferences for repeating of the one or more tests, or a combination thereof, and wherein the control panel presents data regarding the results in one or more heatmaps.

7. The device of claim 1, wherein each UE in the set of UEs executes the one or more tests via an app associated with the processing system.

8. The device of claim 1, wherein the one or more tests are executed by each UE in the set of UEs in accordance with a status of that UE.

9. The device of claim 8, wherein the status relates to battery power, voice or video calling, application or service usage, or a combination thereof.

10. The device of claim 1, wherein the operations further comprise identifying mobility information or statistics regarding each UE in the set of UEs after the obtaining the results associated with the one or more tests.

11. The device of claim 10, wherein the analyzing is performed in accordance with the mobility information or statistics.

12. The device of claim 11, wherein the one or more tests comprise a suite of tests that are to be executed sequentially in waves.

13. A non-transitory machine-readable medium, comprising executable instructions that, when executed by a processing system of a mobile user device including a processor, facilitate performance of operations, the operations comprising:
receiving, from an automated network test server, a test execution policy and a test script for executing a test of a network infrastructure, wherein the mobile user device is included in a select set of mobile user devices for executing the test;
responsive to the receiving, processing the test execution policy to determine whether to execute the test;
performing the test based on a determination to execute the test; and
obtaining results from the test and causing the results to be provided to the automated network test server for processing and analysis.

14. The non-transitory machine-readable medium of claim 13, wherein the test execution policy identifies a minimum required battery level, specifies that there is not to be a voice or video call that is ongoing, identifies one or more applications or services that are to be currently in use, or a combination thereof.

15. The non-transitory machine-readable medium of claim 14, wherein the determination to execute the test is based on identifying that a battery level of the mobile user device exceeds the minimum required battery level, that there is no ongoing voice or video call on the mobile user device, that the one or more applications or services are currently in use, or a combination thereof.

16. The non-transitory machine-readable medium of claim 13, wherein each mobile user device in the select set of mobile user devices is owned and operated by a network provider of the network infrastructure.

17. A method, comprising:
identifying, by a processing system including a processor, and based on a user command or a test schedule, that a suite of tests is to be executed for a core network infrastructure;
based on the identifying, selecting, by the processing system, a set of mobile user devices of a plurality of candidate mobile user devices to execute the suite of tests;
determining, by the processing system, one or more test execution policies for the suite of tests;
providing, by the processing system, commands to the set of mobile user devices to execute the suite of tests in accordance with the one or more test execution policies;
after the providing the commands, receiving, by the processing system, test results from the set of mobile user devices; and
performing, by the processing system, offline analysis of the test results to characterize the core network infrastructure.

18. The method of claim 17, wherein the suite of tests are executed one after another in a pipeline manner.

19. The method of claim 17, wherein the selecting the set of mobile user devices is performed in accordance with one or more policies relating to geographic region, time, location, travel distance, subscriber characteristics, device type, application type, service type, known application peak usage period, known traffic peak period, or a combination thereof.

20. The method of claim 17, wherein the one or more test execution policies relate to repetition periods, number of iterations, battery power status, device or application status, or a combination thereof.

* * * * *